(12) United States Patent
Kannan et al.

(10) Patent No.: US 10,963,423 B2
(45) Date of Patent: Mar. 30, 2021

(54) GENERATING AND IDENTIFYING DISTINCT PORTIONS OF A MERGED FILE

(71) Applicant: Bank of America Corporation, Charlotte, NC (US)

(72) Inventors: Senthil Kumar Kannan, Fort Mill, SC (US); Ketan Patel, Charlotte, NC (US); Akkera Naveen Kumar, Edison, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 492 days.

(21) Appl. No.: 15/889,593

(22) Filed: Feb. 6, 2018

(65) Prior Publication Data
US 2019/0243905 A1    Aug. 8, 2019

(51) Int. Cl.
*G06F 16/11* (2019.01)
*G06F 7/14* (2006.01)

(52) U.S. Cl.
CPC ............. *G06F 16/116* (2019.01); *G06F 7/14* (2013.01)

(58) Field of Classification Search
CPC ........ G06F 16/116; G06F 7/14; G06F 16/183; G06F 16/951; G06F 16/9577; G06F 16/93; G06F 16/355; G06F 16/5846; G06F 16/90; G06F 16/9574; G06F 16/986

See application file for complete search history.

(56) References Cited

U.S. PATENT DOCUMENTS

| | | | |
|---|---|---|---|
| 8,935,654 | B2 | 1/2015 | Sengupta et al. |
| 9,262,404 | B2 | 2/2016 | Ingram et al. |
| 2002/0143882 | A1* | 10/2002 | Matsushita ............ H04L 51/12 709/206 |
| 2005/0197952 | A1 | 9/2005 | Shea et al. |
| 2008/0183483 | A1 | 7/2008 | Hart |
| 2008/0189162 | A1 | 8/2008 | Ganong et al. |
| 2010/0095235 | A1 | 4/2010 | Bennett et al. |
| 2010/0268844 | A1* | 10/2010 | Quinlan ................... G06F 9/52 709/238 |
| 2012/0072859 | A1* | 3/2012 | Wang ................. G06K 9/00442 715/764 |
| 2012/0259752 | A1 | 10/2012 | Agee |

(Continued)

FOREIGN PATENT DOCUMENTS

| | | |
|---|---|---|
| WO | 2005017802 A2 | 2/2005 |
| WO | 2008046210 A9 | 8/2008 |
| WO | 2008090530 A3 | 12/2008 |

*Primary Examiner* — Pierre M Vital
*Assistant Examiner* — Andalib F Lodhi
(74) *Attorney, Agent, or Firm* — Michael A. Springs; Moore & Van Allen PLLC; James C. Edwards (57) ABSTRACT

Embodiments are for generating a merged file and identifying distinct portions of the merged file to improve processing efficiency receive at least two data portions to be merged; determine data formats associated with each of the at least two data portions; condition the at least two data portions based on the determined data formats, thereby creating conditioned data portions having a consistent data format; identify cutoffs for each of the conditioned data portions; after identifying cutoffs for each of the conditioned data portions, add the conditioned data portions to one another, thereby creating a merged file having the consistent data format, the merged file configured for efficient use because of ease of consistent data format and identified cutoffs.

20 Claims, 6 Drawing Sheets

(56) References Cited

U.S. PATENT DOCUMENTS

| | | |
|---|---|---|
| 2012/0272206 A1 | 10/2012 | Sengupta et al. |
| 2013/0185056 A1 | 7/2013 | Ingram et al. |
| 2016/0171425 A1 | 6/2016 | Sanger |
| 2017/0373501 A1 | 12/2017 | Okamoto |

* cited by examiner

GENERATING AND IDENTIFYING DISTINCT PORTIONS OF A MERGED FILE

FIELD

In general, embodiments of the invention relate to improving network processing efficiency and, more particularly, to a system for generating a merged file and identifying distinct portions of the merged file to improve processing efficiency.

BACKGROUND

In various technical environment implementations, files or portions of files must be merged to be used for subsequent purposes. Therefore, a need exists to develop systems, apparatus, computer program products, methods and the like that provide for generating a merged file and identifying distinct portions of the merged file to improve processing efficiency.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for generating a merged file and identifying distinct portions of the merged file to improve processing efficiency.

According to embodiments, a computing environment comprises a computing environment for generating a merged file and identifying distinct portions of the merged file to improve processing efficiency, the computing environment comprising an originating system having a computing platform having a memory and at least one processor in communication with the memory; a plurality of networked communication channels each configured to communicate one or more of a plurality of merged files for use by one or more downstream applications; and an application system in operative communication with the originating system and the plurality of networked communication channels and for accessing and utilizing the one or more merged files, the originating system comprising a computing platform having a memory and at least one processor in communication with the memory, the memory comprising computer-executable instructions, that when executed cause the processor to receive at least two data portions to be merged; determine data formats associated with each of the at least two data portions; condition the at least two data portions based on the determined data formats, thereby creating conditioned data portions having a consistent data format; identify cutoffs for each of the conditioned data portions; after identifying cutoffs for each of the conditioned data portions, add the conditioned data portions to one another, thereby creating a merged file having the consistent data format, the merged file configured for efficient use because of ease of consistent data format and identified cutoffs.

In some embodiments, the computer-executable instructions, when executed further cause the processor to using the identified cutoffs, generate a table of contents comprising information indicating where within the merged file each of the conditioned data portions resides. In some such embodiments, the computer-executable instructions, when executed further cause the processor to add the table of contents to metadata of the merged file. In other such embodiments, the computer-executable instructions, when executed further cause the processor to add the table of contents to the merged file as an additional conditioned data portion.

In some embodiments, the computer-executable instructions, when executed further cause the processor to receive an additional data portion to be merged with the merged file; determine an additional data format associated with the additional data portion; condition the additional data portion, thereby creating a condition additional data portion having the consistent data format; identify an additional cutoff for the conditioned additional data portion; and after identifying the additional cutoff for the conditioned additional data portion, add the conditioned additional data portion to the merged file. In some such embodiments, the computer-executable instructions, when executed further cause the processor to using the identified additional cutoff, modify a table of contents comprising information indicating where within the merged file each of the conditioned data portions resides by adding information indicating where within the merged file the conditioned additional data portion resides, thereby resulting in a modified table of contents. In some of those embodiments, the computer-executable instructions, when executed further cause the processor to replace the table of contents with the modified table of contents.

In some embodiments, the computer-executable instructions, when executed further cause the processor to transmit the merged file to the application system for use.

According to embodiments of the invention, a method for generating a merged file and identifying distinct portions of the merged file to improve processing efficiency includes receiving, by an originating system, at least two data portions to be merged; determining, by the originating system, data formats associated with each of the at least two data portions; conditioning, by the originating system, the at least two data portions based on the determined data formats, thereby creating conditioned data portions having a consistent data format; identifying, by the originating system, cutoffs for each of the conditioned data portions; after identifying cutoffs for each of the conditioned data portions, adding, by the originating system, the conditioned data portions to one another, thereby creating a merged file having the consistent data format, the merged file configured for efficient use because of ease of consistent data format and identified cutoffs.

In some embodiments, the method also includes using the identified cutoffs, generating a table of contents comprising information indicating where within the merged file each of the conditioned data portions resides. In some embodiments, the method also includes adding the table of contents to metadata of the merged file. In other embodiments, the method includes adding the table of contents to the merged file as an additional conditioned data portion.

In some embodiments, the method includes receiving an additional data portion to be merged with the merged file; determining an additional data format associated with the additional data portion; conditioning the additional data portion, thereby creating a condition additional data portion having the consistent data format; identifying an additional cutoff for the conditioned additional data portion; and after identifying the additional cutoff for the conditioned additional data portion, adding the conditioned additional data portion to the merged file.

In some such embodiments, the method includes using the identified additional cutoff, modifying a table of contents comprising information indicating where within the merged file each of the conditioned data portions resides by adding information indicating where within the merged file the conditioned additional data portion resides, thereby resulting in a modified table of contents. In some such embodiments, the method includes replacing the table of contents with the modified table of contents.

In some embodiments, the method includes transmitting the merged file to the application system for use.

According to embodiments of the invention, a computer program product for generating a merged file and identifying distinct portions of the merged file to improve processing efficiency includes a non-transitory computer-readable medium comprising a set of code, that when executed by a processor cause the processor to receive at least two data portions to be merged; determine data formats associated with each of the at least two data portions; condition the at least two data portions based on the determined data formats, thereby creating conditioned data portions having a consistent data format; identify cutoffs for each of the conditioned data portions; and after identifying cutoffs for each of the conditioned data portions, add the conditioned data portions to one another, thereby creating a merged file having the consistent data format, the merged file configured for efficient use because of ease of consistent data format and identified cutoffs.

In some embodiments, the set of code further causes the processor to using the identified cutoffs, generate a table of contents comprising information indicating where within the merged file each of the conditioned data portions resides.

In some embodiments, the set of code further causes the processor to add the table of contents to metadata of the merged file.

In some embodiments, the set of code further causes the processor to add the table of contents to the merged file as an additional conditioned data portion.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are provided for generating a merged file and identifying distinct portions of the merged file to improve processing efficiency.

Embodiments of the system address the problem of an entity being unable to leverage a table of content or merge documents into a storage format (such as PDF) with a default plug-in of a business process management (BPM) software platform (such as Aspose). A customized plug-in for a BPM platform is provided by embodiments of the invention. Embodiments maybe implemented within a continuity planning tool or otherwise and enable generation of a storage format file with a table of contents. Embodiments also enable merging of documents of varying types such as text documents, image documents, spreadsheets and others. Embodiments also address the problem of lack of support for exporting storage format (e.g., PDF) files without delay, which is, in a process that is computationally efficient, therefore exhibiting fewer delays on a user interface.

In other words, embodiments of the invention are for generating a merged file and identifying distinct portions of the merged file to improve processing efficiency receive at least two data portions to be merged. The embodiments determine data formats associated with each of the at least two data portions; condition the at least two data portions based on the determined data formats, thereby creating conditioned data portions having a consistent data format; identify cutoffs for each of the conditioned data portions; after identifying cutoffs for each of the conditioned data portions, add the conditioned data portions to one another, thereby creating a merged file having the consistent data format, the merged file configured for efficient use because of ease of consistent data format and identified cutoffs.

Figure 1:
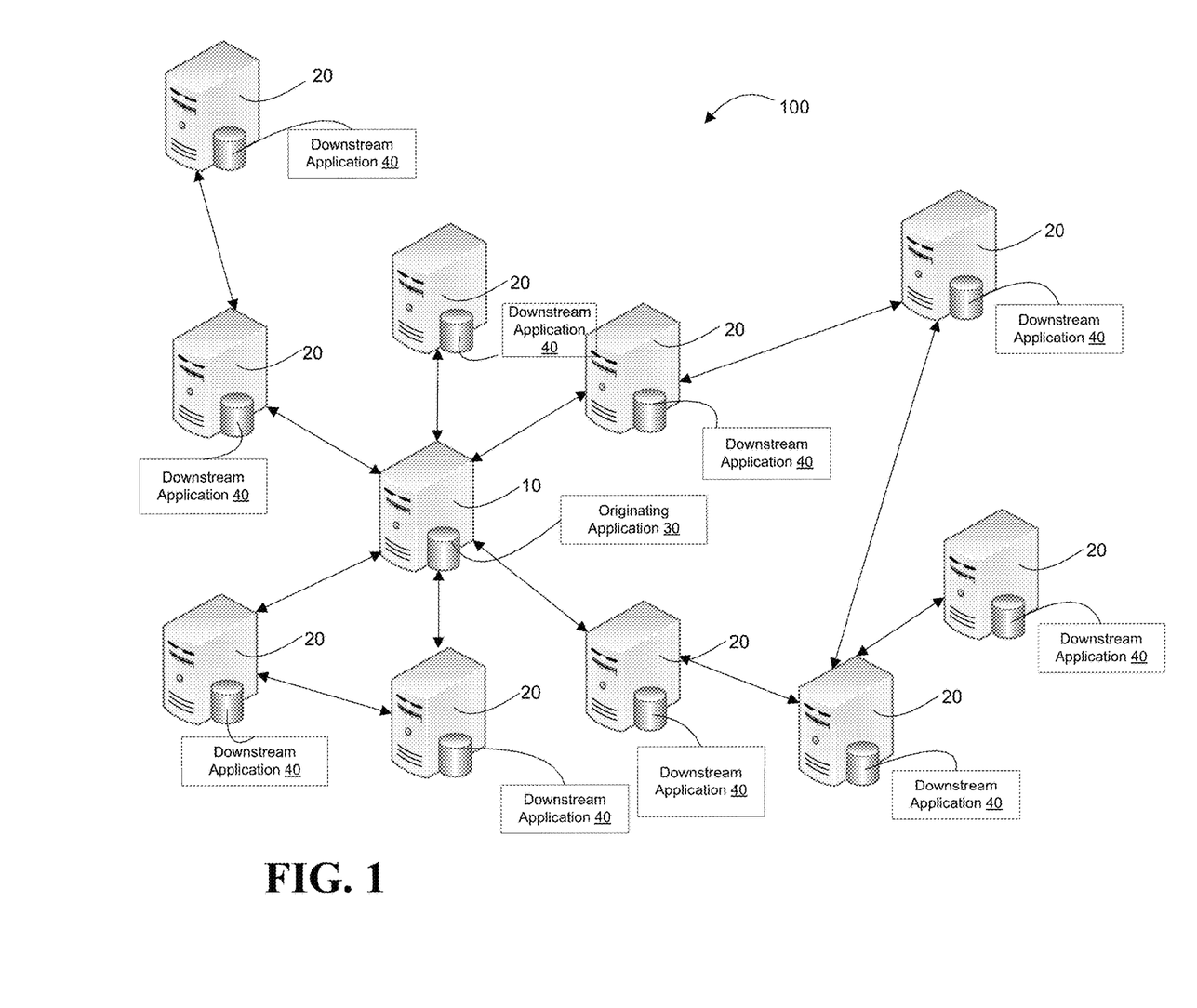
FIG. 1 provides a schematic diagram of a system for generating a merged file and identifying distinct portions of the merged file to improve processing efficiency, in accordance with embodiments of the present invention.

Referring to FIG. 1, a schematic diagram is provided of a system 100 for generating a merged file and identifying distinct portions of the merged file to improve processing efficiency, in accordance with embodiments of the present invention. In some embodiments, the system 100 is configured as a hub-and-spoke model, in which the originating system 10 represents a hub to the various "downstream" or "spoke" applications that are affected by the originating application called by the originating system 10. In other words, the originating system 10 may be a server, system, computer or the like that includes an originating application 30 that, when called either by the originating system 10 or some other system, generates a file that is utilized by one or more downstream or spoke applications which may run on one or more downstream or spoke servers 20, which may be implemented throughout an enterprise or network. Such spoke servers may be deployed in a "hub-and-spoke" formation, and/or may be deployed in one or more linear communication pathways from the originating system 10 along with various interconnections between spoke servers 20 as shown in FIG. 1. For example, the originating system 10 may run an originating application 30 that generates a merged file that is utilized by one or more downstream applications 40, one of which is called on a spoke server 20 directly connected with the originating system 10 and another of which is called on a sub-spoke server (not shown) directly connected with the spoke server 20 but not directly connected with the originating system 10, and so forth. To be clear, one linear communication pathway may connect the originating system 10 with one or more spoke servers 20 and sub-spoke servers, or two or more linear and/or more complex communication pathways may connect the originating system 10 with one or more spoke and sub-spoke servers. In a similar fashion, an application system (discussed later) may be connected directly and/or in a relatively complex fashion with various control systems for communication of control information (not shown here).

The spoke servers 20 may be one or more systems or servers and may constitute or include one or more communication pathways, channels or systems configured to communicate instructions for calling one or more downstream applications 40.

The downstream applications 40 may be required for performance of the originating application or may be optional for performance of the originating application. In some scenarios, the downstream applications 40 may be called and subsequently it may be determined that a downstream applications 40 may be unnecessary for a particular instance of an originating application 30. In some embodiments, the invention distinguishes between such applications such that calling of a downstream application that is unnecessary for operation of an originating application 30 may not be considered a connection.

Figure 2:
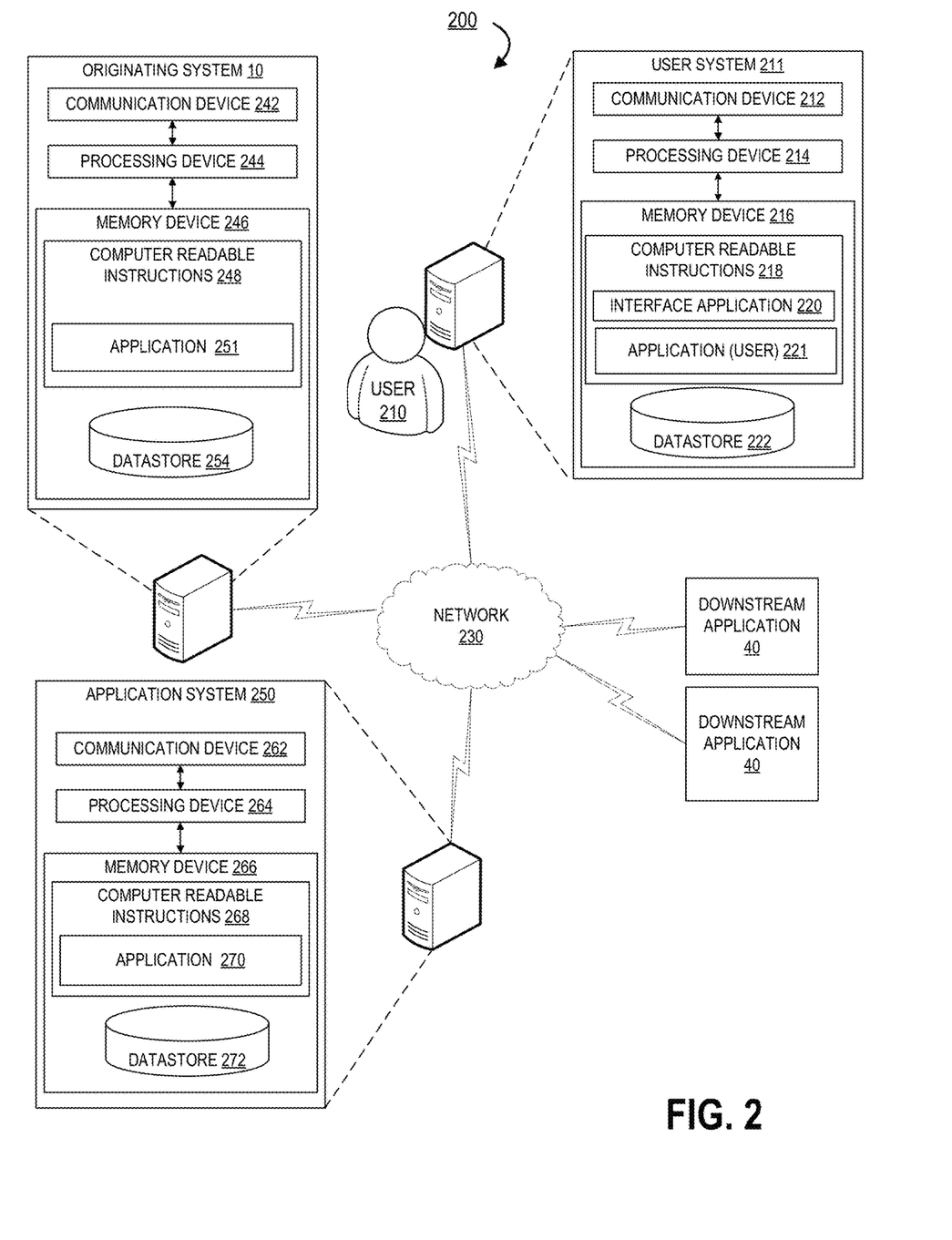
FIG. 2 provides a schematic diagram of an environment in which systems discussed herein operate, in accordance with embodiments of the present invention.

Referring now to FIG. 2, an environment 200 in which an originating system 240, an application system 250, and multiple spoke systems 20 operate is illustrated, in accordance with some embodiments of the invention. The environment 200 includes a user system 211 associated or used with authorization of a user 210 (e.g., an associate, a manager, a vendor or the like), an originating system 10 and multiple spoke systems 20 (represented by downstream applications 40 in the figure). In some embodiments, one or more of the spoke systems 20 are external systems, which may be maintained or managed by third party entities.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The user system 211, the originating stem 10 (or hub server) and the application systems 250 (or spoke servers) each include a computer system, server, multiple computer systems and/or servers or the like. The originating system 10, in the embodiments shown has a communication device 242 communicably coupled with a processing device 244, which is also communicably coupled with a memory device 246. The processing device 244 is configured to control the communication device 242 such that the originating system 10 communicates across the network 230 with one or more other systems. The processing device 244 is also configured to access the memory device 246 in order to read the computer readable instructions 248, which in some embodiments includes one or more applications 251 or modules, which may or may not be the same as applications and/or modules running on the user system 211 and/or the application system 250. The memory device 246 also includes a datastore 254 or database for storing pieces of data that can be accessed by the processing device 244. In some embodiments, the datastore 254 includes one or more files that are inputs for a file merging process as discussed herein. In other embodiments, one or more of the files or portions of files being merged as discussed herein are sourced from one or more disparate systems, such as a spoke system 20 or other system (not shown).

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

In some embodiments, data related to file or portions of files to be merged and/or data related to tracking length or cutoff thresholds for specific files or portions of files (for purposes of flagging for table of contents as discussed further below) may be stored in a non-volatile memory distinct from instructions for executing one or more process steps discussed herein that may be stored in a volatile memory such as a memory directly connected or directly in communication with a processing device executing the instructions. In this regard, some or all the process steps carried out by the processing device may be executed in near-real-time, thereby increasing the efficiency by which the processing device may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices.

The user system 211 includes a communication device 212 communicably coupled with a processing device 214, which is also communicably coupled with a memory device 216. The processing device 214 is configured to control the communication device 212 such that the user system 211 communicates across the network 230 with one or more other systems. The processing device 214 is also configured to access the memory device 216 in order to read the computer readable instructions 218, which in some embodiments includes an interface application 220 and application 221. The memory device 216 also includes a datastore 222 or database for storing pieces of data that can be accessed by the processing device 214.

The application system 250 includes a communication device 262 communicably coupled with a processing device 264, which is also communicably coupled with a memory device 266. The processing device 264 is configured to control the communication device 262 such that the spoke system 20 communicates across the network 230 with one or more other systems. The processing device 264 is also configured to access the memory device 266 in order to read the computer readable instructions 268, which in some embodiments includes an application 270. The memory device 266 also includes a datastore 272 or database for storing pieces of data that can be accessed by the processing device 264. The application 270 may be or include a downstream application 40.

In some embodiments, the application 251, the application 221 and the application 270 interact with one another to implement the process steps described herein. In some embodiments, the application 251 is called and one or more spoke applications such as application 270 are called to support application 251. In some such cases, the application 221 queries the system or environment periodically as described herein to identify the application calls and their various characteristics and associated exposures, among other process steps described further below.

The applications 220, 221, 251, and 270 are for instructing the processing devices 214, 244 and 264 to perform various steps of the methods discussed herein, and/or other steps and/or similar steps. In various embodiments, one or more of the applications 220, 221, 251, and 270 are included in the computer readable instructions stored in a memory device of one or more systems or devices other than the systems 10, 20 and 211. For example, in some embodiments, the application 220 is stored and configured for being accessed by a processing device of one or more external systems 21 connected to the network 230. In various embodiments, the applications 220, 221, 251, and 270 stored and executed by different systems/devices are different. In some embodiments, the applications 220, 221, 251, and 270 stored and executed by different systems may be similar and may be configured to communicate with one another, and in some embodiments, the applications 220, 221, 251, and 270 may be considered to be working together as a singular application despite being stored and executed on different systems.

In various embodiments, one of the systems discussed above, such as the originating system 10, is more than one system and the various components of the system are not collocated, and in various embodiments, there are multiple components performing the functions indicated herein as a single device. For example, in one embodiment, multiple processing devices perform the functions of the processing device 244 of the originating system 10 described herein. In various embodiments, the originating system 10 includes one or more of the external systems 21 and/or any other system or component used in conjunction with or to perform any of the method steps discussed herein.

In various embodiments, the originating system 10, the application system 250, and the user system 211 and/or other systems may perform all or part of one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Figure 3:
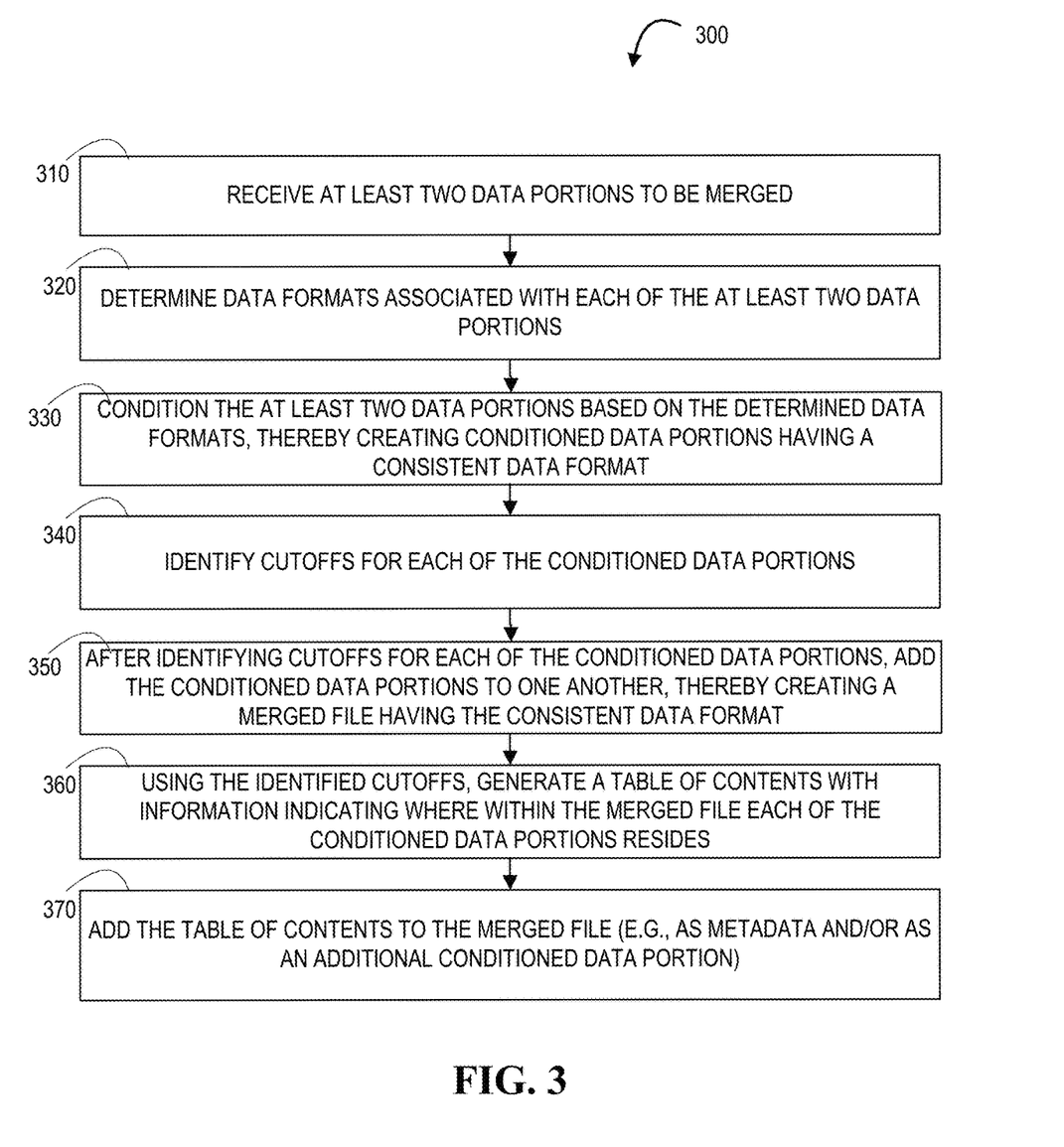
FIG. 3 provides a flowchart of a method for generating a merged file and identifying distinct portions of the merged file to improve processing efficiency, in accordance with embodiments of the present invention.

Referring now to FIG. 3, a flowchart illustrates a method 300 for generating a merged file and identifying distinct portions of the merged file to improve processing efficiency. The first step, as represented by block 310 is to receive at least two data portions to be merged. In some embodiments the data portions are received and/or retrieved from disparate systems throughout a network or entity. In other embodiments some or all the data portions are stored on the system performing the operations. The next step, as represented by block 320, is to determine data formats associated with each of the at least two data files. For example, the data files may be in one or more of the following formats: text format, HTTP format, XML format, PDF format, spreadsheet format, image format or the like.

Next, as represented by block 330, embodiments condition the at least two data portions based on the determined data formats. This creates conditioned data portions having consistent data formats. For example, in some embodiments, a spreadsheet file must be conditioned by identifying which portions of the spreadsheet file will be merged by identifying cells within the spreadsheet that contain data, setting a print area to include those cells and extracting the cells within the print area. Then, the extracted portion may be converted to the consistent data format, such as a storage format like PDF.

Then, as represented by block 340, embodiments identify cutoffs for each of the conditioned data portions. This may be done by noting how large the data file is, how many pages the data file represents or some other metric by which the size of the data file may be measured.

Then, as represented by block 350, embodiments, after identifying cutoffs for each of the conditioned data portions, add the conditioned data portions to one another. This creates a merged file having the consistent data format.

The embodiments may then, as represented by block 360, use the identified cutoffs to generate a table of contents (TOC) with information indicating where within the merged file each of the conditioned data portions resides. In some embodiments, each of the cutoffs is or includes a pointer to its associated data portion. In some cases, the pointers are stored in a table or within metadata of the merged file so that a TOC may be constructed as needed. In some embodiments, as represented by block 370, the TOC itself may be added to the merged file. For example, in some embodiments, the TOC may be added to metadata of the merged file and/or may be added as an additional conditioned data portion of the merged file).

Figure 4:
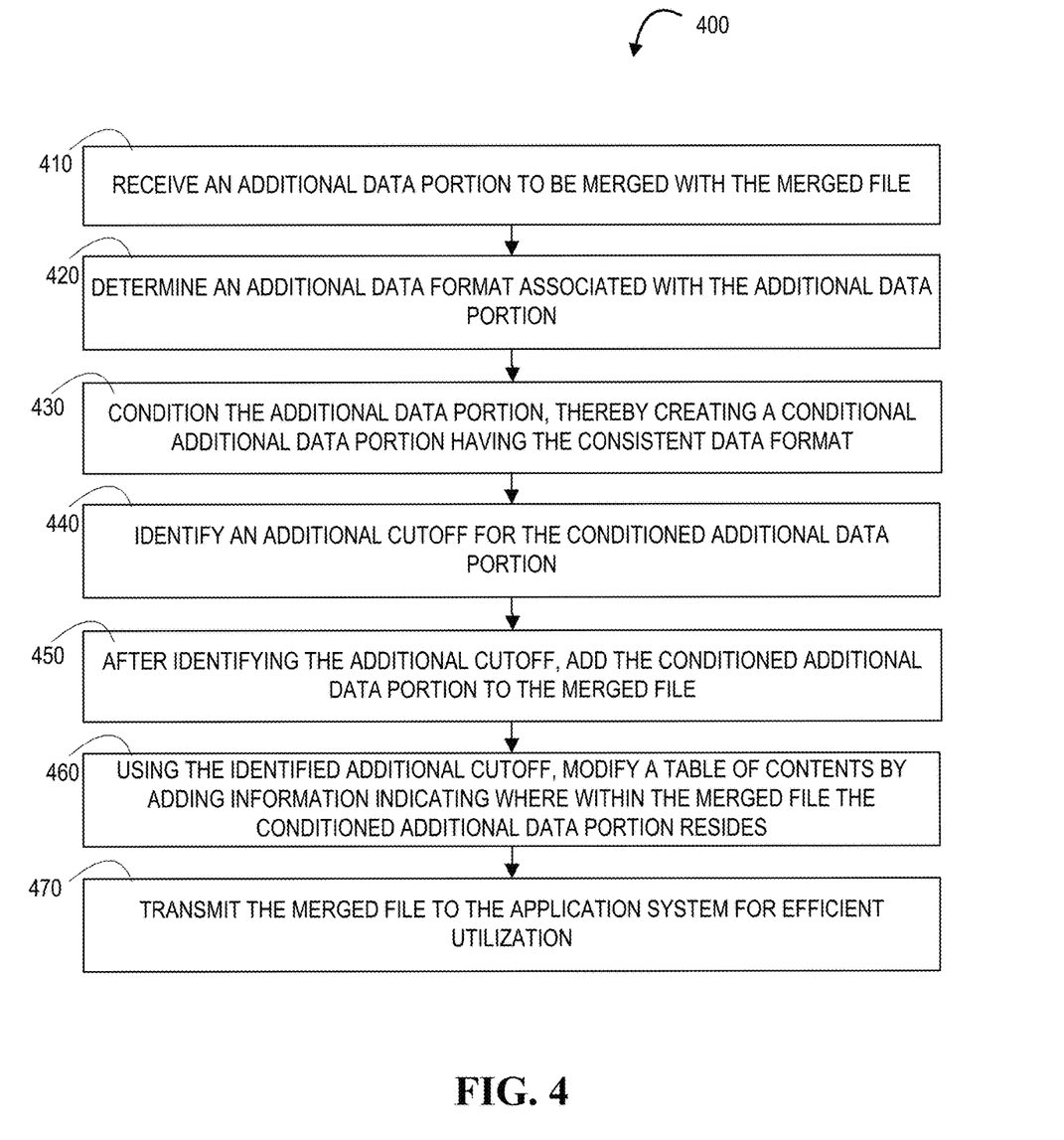
FIG. 4 provides a flowchart of a method for generating a merged file and identifying distinct portions of the merged file to improve processing efficiency including additional steps, in accordance with embodiments of the present invention.

Referring now to FIG. 4, a flowchart of a method for generating a merged file and identifying distinct portions of the merged file to improve processing efficiency including additional steps, in accordance with embodiments of the present invention is shown. The first step, as represented by block 410, is to receive an additional data portion to be merged with the merged file. The next step, as represented by block 420, is to determine an additional data format associated with the additional data portion. Then, as represented by block 430, embodiments condition the additional data portion, thereby creating a conditional additional data portion having the consistent data format. Next, embodiments identify an additional cutoff for the conditioned additional data portion, as represented by block 440. After identifying the additional cutoff, embodiments add the conditioned additional data portion to the merged file, as represented by block 450. Then, using the identified additional cutoff, embodiments modify a TOC by adding information indicating where within the merged file the conditioned additional data portion resides, as represented by block 460. Finally, as represented by block 470, embodiments transmit the merged file to the application system for efficient utilization.

Figure 5:
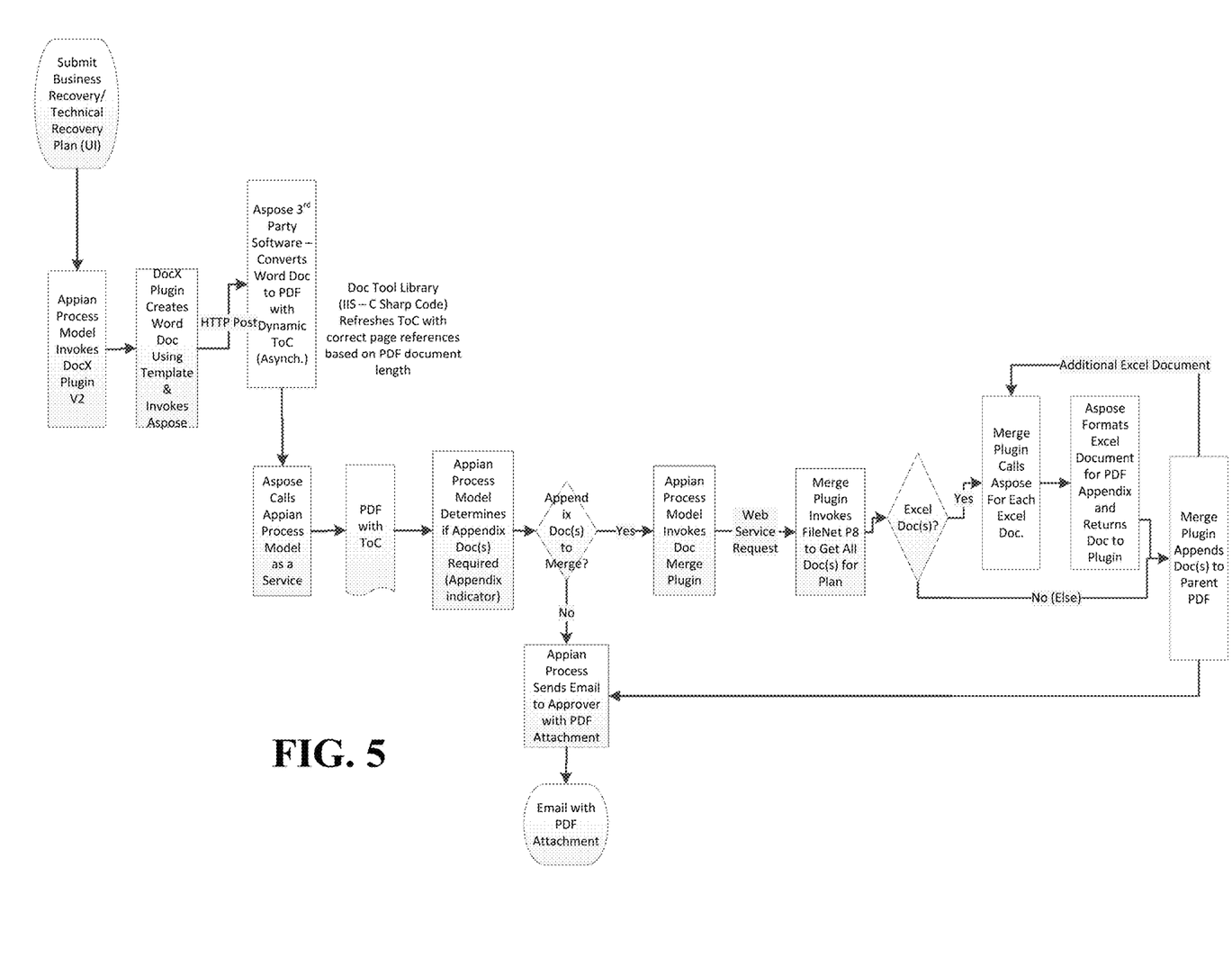
FIG. 5 provides a flowchart of a method for generating a merged file and identifying distinct portions of the merged file to improve processing efficiency, in accordance with embodiments of the present invention.

Referring now to FIG. 5, a flowchart of a method for generating a merged file and identifying distinct portions of the merged file to improve processing efficiency, in accordance with embodiments of the present invention is shown. As shown, a user may initially submit a business recovery and/or technical recovery plan using a user interface. Then, an application (such as Appian) invokes a plug-in application. The plug-in application may create a document using a template. The BPM platform (e.g., Aspose) may then be invoked. The BPM platform may then convert the document to a storage format (such as PDF) with a dynamic TOC as discussed herein. The BPM platform then may call the application as a service, which accesses the storage format file with TOC. Then the application determines if additional documents (or files) need to be appended (or added) to the file. If so, then the BPM platform performs a web service request of a merge plug-in (part of the application of the originating system as referred to herein). The merge plug-in invokes a program to retrieve all files necessary for the merge. If such files are spreadsheet documents (e.g., Excel files) then the merge plug-in calls the BPM platform for each file, formats the files for storage (i.e., PDF) and then returns the formatted files to the plug-in. As discussed above, this process is referred to herein as conditioning the files prior to merging. Then the merge plug-in adds the conditioned files to the parent PDF. The application then sends the merged file, for example, using email.

Figure 6:
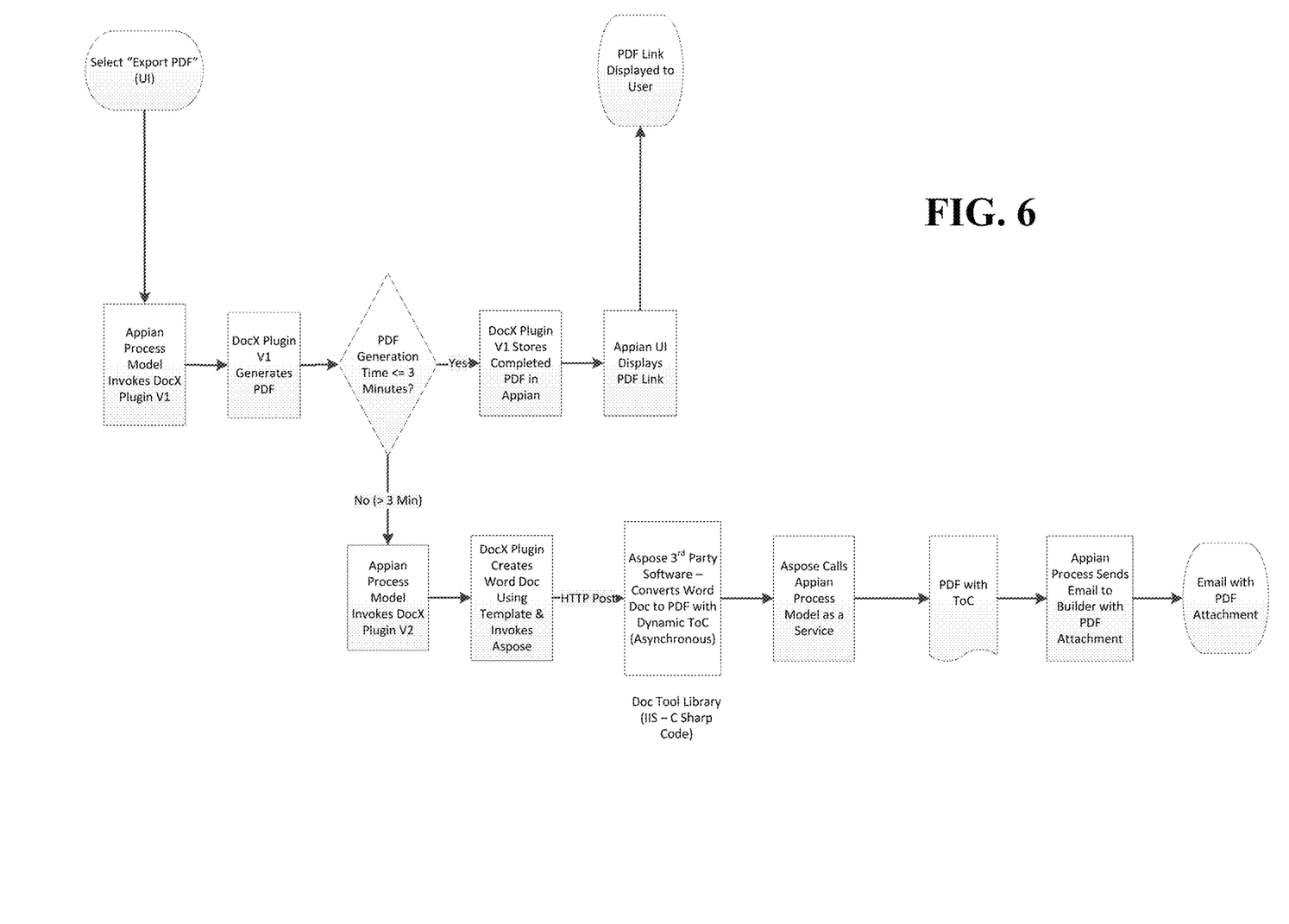
FIG. 6 provides a flowchart of a method for exporting the merged file, in accordance with embodiments of the present invention.

Referring now to FIG. 6, a flowchart of a method for exporting the merged file, in accordance with embodiments of the present invention is shown. A user may select an option to export a PDF (or stored format file). An application (e.g., Appian) may invoke a plug-in that generates a storage format file (PDF). If the processing is less than a predetermined threshold (such as three minutes), then the process outputs the file in PDF format and the link is displayed to the user. If the processing is greater than the predetermined threshold (or calculated to be so), then the application invokes a second plug-in that creates a document using a template and also invokes a BPM platform. The BPM platform converts the document to a storage format (PDF) with a dynamic TOC as discussed herein. The BPM platform calls the application as a service, accesses the storage format file with TOC and send the file as required.

In some cases, embodiments of the system allow for creation of group and user profiles and designation of application types to the groups and individual users. Embodiments of the system herein described provides for existing risk-characteristic mappings to be changed/edited (i.e., for application characteristics, risk and associated controls), new application characteristic entries or mappings to be added or obsolete entries to be deleted and, as a result of such changes/additions/deletions, automatically adapt all resource and/or control dependencies that are affected by the change or addition.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computing environment for generating a merged file and identifying distinct portions of the merged file to improve processing efficiency, the computing environment comprising:
an originating system having a computing platform having a memory and at least one processor in communication with the memory;
a plurality of networked communication channels each configured to communicate one or more of a plurality of merged files for use by one or more downstream applications; and
an application system in operative communication with the originating system and the plurality of networked communication channels and for accessing and utilizing the one or more merged files,
the originating system comprising a computing platform having a memory and at least one processor in communication with the memory, the memory comprising computer-executable instructions, that when executed cause the processor to:
receive at least two data portions to be merged by (i) invoking, by a robotics process automation application, a merge plug-in module, and (ii) performing a web service request for the merge plug-in module to invoke a file retrieval program and retrieve the at least two data portions;
determine data formats associated with each of the at least two data portions, wherein at least one of the data formats is a spreadsheet format;
condition the at least two data portions based on the determined data formats, thereby creating conditioned data portions having a consistent data format, wherein conditioning the spreadsheet format includes (i) the merge plug-in calling a business process management (BPM) platform for each data portion in spreadsheet format, (ii) having the BPM platform format each data portion in spreadsheet format to portable document format (PDF), (iii) returning each of the data portions in PDF to the merge plug-in;
identify cutoffs for each of the conditioned data portions;
after identifying cutoffs for each of the conditioned data portions, add the conditioned data portions to one another, thereby creating a merged file having the consistent data format, the merged file configured for efficient use because of ease of consistent data format and identified cutoffs.

2. The computing environment of claim 1, wherein the computer-executable instructions, when executed further cause the processor to:
using the identified cutoffs, generate a table of contents comprising information indicating where within the merged file each of the conditioned data portions resides.

3. The computing environment of claim 2, wherein the computer-executable instructions, when executed further cause the processor to:
add the table of contents to metadata of the merged file.

4. The computing environment of claim 2, wherein the computer-executable instructions, when executed further cause the processor to:
add the table of contents to the merged file as an additional conditioned data portion.

5. The computing environment of claim 1, wherein the computer-executable instructions, when executed further cause the processor to:
receive an additional data portion to be merged with the merged file;
determine an additional data format associated with the additional data portion;
condition the additional data portion, thereby creating a condition additional data portion having the consistent data format;
identify an additional cutoff for the conditioned additional data portion; and
after identifying the additional cutoff for the conditioned additional data portion, add the conditioned additional data portion to the merged file.

6. The computing environment of claim 5, wherein the computer-executable instructions, when executed further cause the processor to:
using the identified additional cutoff, modify a table of contents comprising information indicating where within the merged file each of the conditioned data portions resides by adding information indicating where within the merged file the conditioned additional data portion resides, thereby resulting in a modified table of contents.

7. The computing environment of claim 6, wherein the computer-executable instructions, when executed further cause the processor to:
replace the table of contents with the modified table of contents.

8. The computing environment of claim 1, wherein the computer-executable instructions, when executed further cause the processor to:
transmit the merged file to the application system for use.

9. A method for generating a merged file and identifying distinct portions of the merged file to improve processing efficiency, the method comprising:
receiving, by an originating system, at least two data portions to be merged by (i) invoking, by a robotics process automation application, a merge plug-in module, and (ii) performing a web service request for the merge plug-in module to invoke a file retrieval program and retrieve the at least two data portions;
determining, by the originating system, data formats associated with each of the at least two data portions, wherein at least one of the data formats is a spreadsheet format;
conditioning, by the originating system, the at least two data portions based on the determined data formats, thereby creating conditioned data portions having a consistent data format, wherein conditioning the spreadsheet format includes (i) the merge plug-in calling a business process management (BPM) platform for each data portion in spreadsheet format, (ii) having the BPM platform format each data portion in spreadsheet format to portable document format (PDF), (iii) returning each of the data portions in PDF to the merge plug-in;
identifying, by the originating system, cutoffs for each of the conditioned data portions; and
after identifying cutoffs for each of the conditioned data portions, adding, by the originating system, the conditioned data portions to one another, thereby creating a merged file having the consistent data format, the merged file configured for efficient use because of ease of consistent data format and identified cutoffs.

10. The method of claim 9, further comprising:
using the identified cutoffs, generating a table of contents comprising information indicating where within the merged file each of the conditioned data portions resides.

11. The method of claim 10, further comprising:
adding the table of contents to metadata of the merged file.

12. The method of claim 10, further comprising:
adding the table of contents to the merged file as an additional conditioned data portion.

13. The method of claim 9, further comprising:
receiving an additional data portion to be merged with the merged file;
determining an additional data format associated with the additional data portion;
conditioning the additional data portion, thereby creating a condition additional data portion having the consistent data format;
identifying an additional cutoff for the conditioned additional data portion; and
after identifying the additional cutoff for the conditioned additional data portion, adding the conditioned additional data portion to the merged file.

14. The method of claim 13, further comprising:
using the identified additional cutoff, modifying a table of contents comprising information indicating where within the merged file each of the conditioned data portions resides by adding information indicating where within the merged file the conditioned additional data portion resides, thereby resulting in a modified table of contents.

15. The method of claim 14, further comprising:
replacing the table of contents with the modified table of contents.

16. The method of claim 9, further comprising:
transmitting the merged file to the application system for use.

17. A computer program product for generating a merged file and identifying distinct portions of the merged file to improve processing efficiency, the computer program product comprising a non-transitory computer-readable medium comprising a set of code, that when executed by a processor cause the processor to:
receive at least two data portions to be merged by (i) invoking, by a robotics process automation application, a merge plug-in module, and (ii) performing a web service request for the merge plug-in module to invoke a file retrieval program and retrieve the at least two data portions;
determine data formats associated with each of the at least two data portions, wherein at least one of the data formats is a spreadsheet format;
condition the at least two data portions based on the determined data formats, thereby creating conditioned data portions having a consistent data format, wherein conditioning the spreadsheet format includes (i) the merge plug-in calling a business process management (BPM) platform for each data portion in spreadsheet format, (ii) having the BPM platform format each data portion in spreadsheet format to portable document format (PDF), (iii) returning each of the data portions in PDF to the merge plug-in;
identify cutoffs for each of the conditioned data portions; and
after identifying cutoffs for each of the conditioned data portions, add the conditioned data portions to one another, thereby creating a merged file having the consistent data format, the merged file configured for efficient use because of ease of consistent data format and identified cutoffs.

18. The computer program product of claim 17, wherein the set of code further causes the processor to: using the identified cutoffs, generate a table of contents comprising information indicating where within the merged file each of the conditioned data portions resides.

19. The computer program product of claim 17, wherein the set of code further causes the processor to: add the table of contents to metadata of the merged file.

20. The computer program product of claim 17, wherein the set of code further causes the processor to: add the table of contents to the merged file as an additional conditioned data portion.

* * * * *